United States Patent
Livingston

(10) Patent No.: US 6,696,698 B2
(45) Date of Patent: Feb. 24, 2004

(54) METHOD AND APPARATUS FOR RADIOGRAPHIC IMAGING

(75) Inventor: Troy W. Livingston, Northbrook, IL (US)

(73) Assignee: Essex Electro Engineers, Inc., Schaumburg, IL (US)

(*) Notice: Subject to any disclaimer, the term of this patent is extended or adjusted under 35 U.S.C. 154(b) by 22 days.

(21) Appl. No.: 09/990,164

(22) Filed: Nov. 21, 2001

(65) Prior Publication Data

US 2002/0104975 A1 Aug. 8, 2002

Related U.S. Application Data

(63) Continuation-in-part of application No. PCT/US01/20481, filed on Jun. 27, 2001, which is a continuation-in-part of application No. 09/721,014, filed on Nov. 22, 2000, now Pat. No. 6,555,838.

(60) Provisional application No. 60/214,930, filed on Jun. 29, 2000.

(51) Int. Cl.$^7$ .................. G03B 42/08; G03B 42/02
(52) U.S. Cl. .................. 250/584; 250/585; 250/586
(58) Field of Search ................ 250/584, 585, 250/586, 582

(56) References Cited

U.S. PATENT DOCUMENTS

| | | | |
|---|---|---|---|
| 4,212,516 A | | 7/1980 | Sawamura |
| 4,343,991 A | * | 8/1982 | Fujiwara et al. ........ 250/227.11 |
| 4,409,477 A | * | 10/1983 | Carl ................ 250/227.11 |
| 4,485,302 A | * | 11/1984 | Tanaka et al. ............ 250/585 |
| 4,655,590 A | * | 4/1987 | Aagano et al. ............ 356/72 |
| 4,737,641 A | | 4/1988 | Lange et al. |
| 4,837,436 A | | 6/1989 | Whiting |
| 4,876,452 A | * | 10/1989 | Horikawa ............... 250/585 |
| 4,933,558 A | | 6/1990 | Carter et al. |
| 4,950,895 A | * | 8/1990 | Reinfelder .............. 250/585 |
| 4,953,038 A | | 8/1990 | Schiebel et al. |
| 4,970,394 A | | 11/1990 | Boutet et al. |
| 5,012,096 A | | 4/1991 | Takeda et al. |
| 5,087,937 A | * | 2/1992 | Frick et al. .............. 355/1 |
| 5,109,459 A | | 4/1992 | Eibert et al. |
| 5,136,150 A | | 8/1992 | Fukushima et al. |
| 5,208,459 A | * | 5/1993 | Morrone et al. ........... 250/585 |
| 5,266,803 A | | 11/1993 | Hffelfinger |
| 5,402,508 A | | 3/1995 | O'Rourke et al. |
| 5,408,093 A | | 4/1995 | Ito et al. |
| 5,461,233 A | | 10/1995 | Yamamoto et al. |
| 5,528,050 A | | 6/1996 | Miller et al. |

(List continued on next page.)

FOREIGN PATENT DOCUMENTS

| | | | | |
|---|---|---|---|---|
| JP | 60093425 A | * | 5/1985 | ........ G03B/42/02 |
| JP | 03002746 A | * | 1/1991 | ........ G03B/42/02 |

Primary Examiner—Albert Gagliardi
(74) Attorney, Agent, or Firm—Fitch, Even, Tabin & Flannery

(57) ABSTRACT

An apparatus and method for computed radiography includes an optical pump source which may be a plurality of light emitting diodes or a movable laser. Pumping light from the optical pump source is carried through each of a plurality of optical fibers arranged in a linear array to a previously-exposed computed radiography plate having a latent X-ray image formed thereon. The plate is moved with respect to the fibers. One of a second plurality of optical fibers arranged in a linear array or a light pipe receives light emitted from the radiographic medium due to excitation by the pumping light. The second plurality of optical fibers or light pipe supplies the emitted light to an optical source, which may be a photodiode or a photomultiplier tube, where an image signal responsive to the light intensity of the emitted light is generated. The image signal is digitized and sent to a processor which generates an image representative of the latent X-ray image on the computed radiography plate.

22 Claims, 9 Drawing Sheets

U.S. PATENT DOCUMENTS

| | | |
|---|---|---|
| 5,541,421 A | 7/1996 | Brandt et al. |
| 5,594,253 A | 1/1997 | Bueno et al. |
| 5,691,535 A * | 11/1997 | Boutet ........................ 250/234 |
| 5,740,291 A | 4/1998 | De Lasa et al. |
| 5,771,091 A | 6/1998 | Paritsky et al. |
| 5,796,113 A | 8/1998 | Nagli et al. |
| 5,804,819 A | 9/1998 | Vuylsteke et al. |
| 5,814,831 A | 9/1998 | Verbeke |
| 5,900,640 A * | 5/1999 | Ogura ........................ 250/583 |
| 5,901,240 A | 5/1999 | Luo et al. |
| 5,940,566 A | 8/1999 | Seng |

* cited by examiner

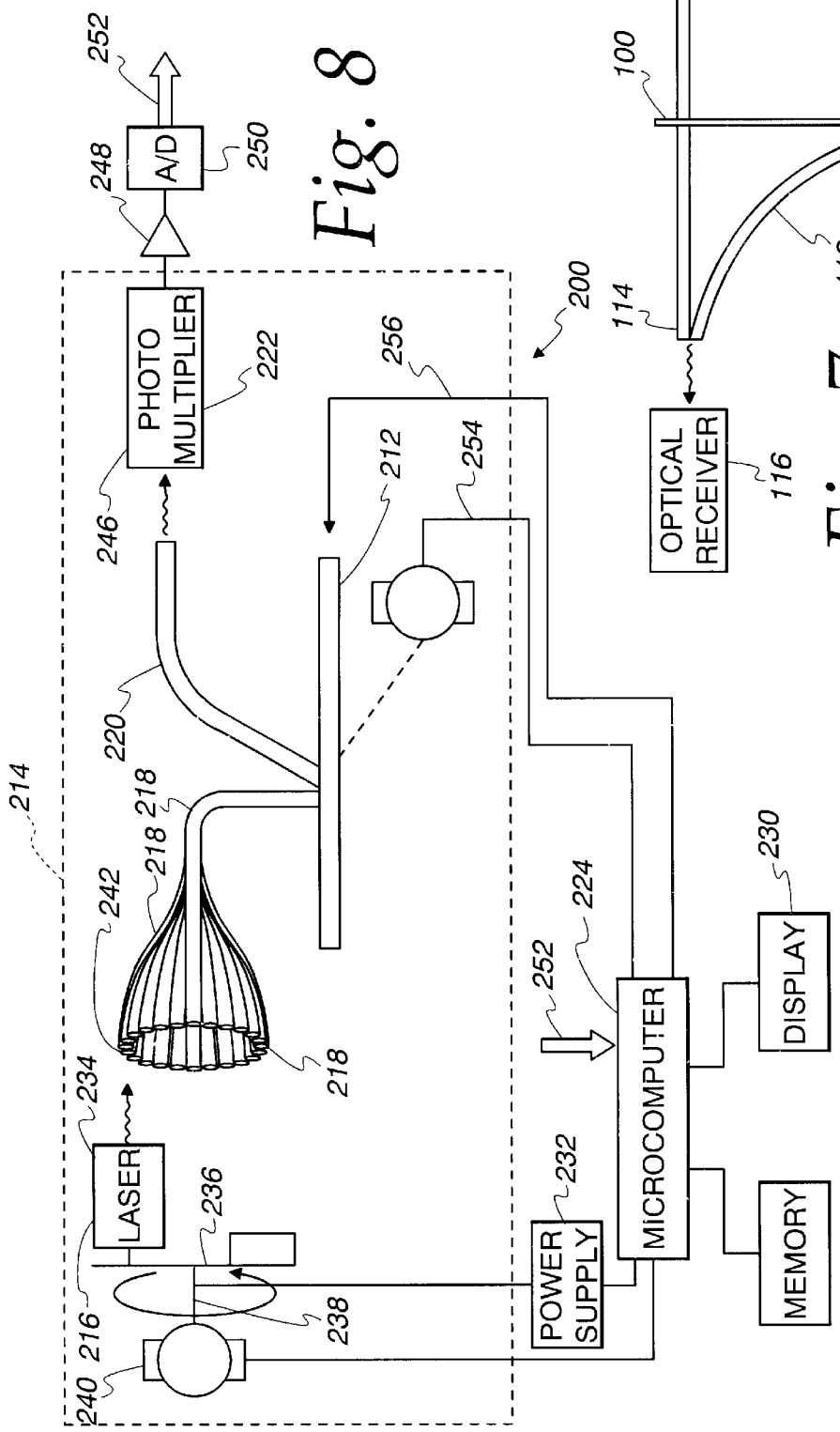

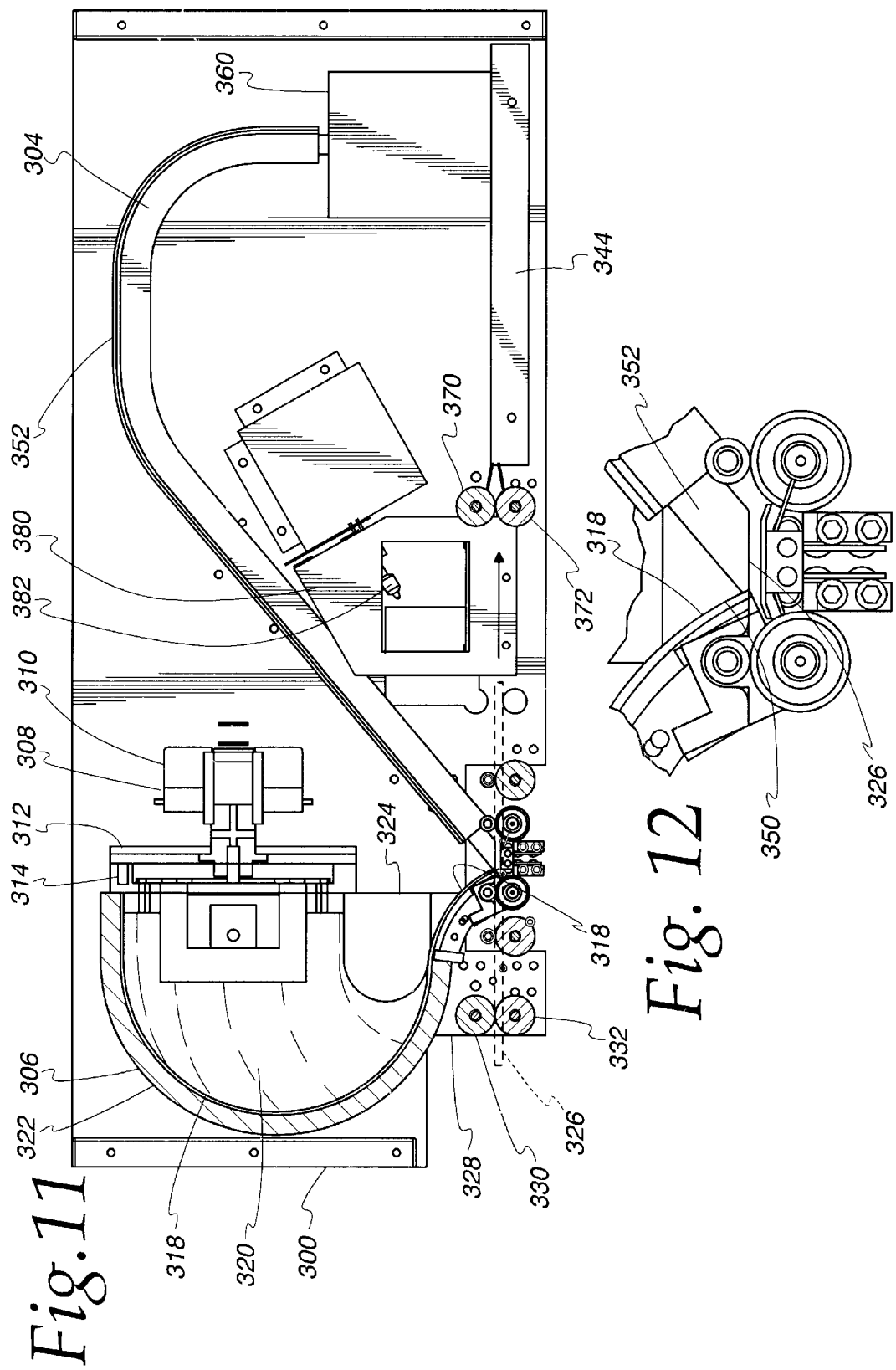

METHOD AND APPARATUS FOR RADIOGRAPHIC IMAGING

CROSS REFERENCE TO RELATED APPLICATIONS

This is a continuation-in-part of copending international application no. PCT/US01/20481, filed Jun. 27, 2001, designating the United States of America, which is a continuation-in-part of copending U.S. application Ser. No. 09/721,014, filed Nov. 22, 2000, now U.S. Pat. No. 6,555,838 which claimed priority from U.S. provisional application No. 60/214,930, filed Jun. 29, 2000. International application no. PCT/US01/20481 also claimed priority from U.S. provisional application No. 60/214,930, filed Jun. 29, 2000.

BACKGROUND OF THE INVENTION

The invention generally relates to radiographic imaging and, more particularly, relates to a method and apparatus for reading a computed radiography phosphor plate or sheet that has been exposed by X rays by supplying pumping light thereto.

It is well known that, by using X-ray systems, features can be visualized within the human body or within industrial products, or the like. Current X-ray systems often use X-ray film which must be developed.

In the alternative, computed tomography installations are available but are very expensive and require large amounts of computer power.

In addition systems exist which use a technique called computed radiography. A patient is exposed with X rays and a latent X-ray image is formed on a phosphor-containing computed radiography plate or sheet that is similar to a sheet of film. The phosphor-containing sheet typically may include a rare earth, such as europium, in combination with barium and fluorine. Other sheet formulations also are available. The sheet is sensitive to X rays and can store a latent X-ray image thereon. Because the sheet is also sensitive to light it is kept in the dark. A sheet containing a latent X-ray image is imaged in a scanner by exposing the sheet and its latent image to a raster-scanned laser beam. Areas of the sheet which have preferentially received X-ray energy phosphoresce, making the latent X-ray image visible.

While the scanner is convenient and allows reuse of the computed radiography sheets multiple numbers of times, it does suffer from certain drawbacks. It is difficult to obtain a high-spatial resolution image because the pumping laser beam, although only covering a small spot-size at a time, tends to leave illumination energy behind, which causes bloom; thereby smearing the image and reducing its resolution. This is because the image is built up in the way that an image would be in a flying spot device wherein only a single optical detector is used. The single optical detector can capture radiation from almost any position on the sheet. The optical detector, however, is unable to determine whether the photons it is receiving are coming from unwanted bloom or coming from active phosphorescence caused by excitation by the laser beam.

In addition the existing systems either operate in the laser visible region at about 630 to 650 nanometers or, in the near infrared region, at about 940 nanometers.

A single laser cannot be used for both wavelengths. Because there are differing types of latent imaging materials used for computed radiography, not all phosphoresce either with red pumping light or with infrared pumping light. A scanner which uses a pumping laser in either the red or infrared region cannot accept plates or sheets having latent images which must be optically pumped in the other region.

The prior raster-scanned laser systems introduce spatial non-linearities in the image for which there must be compensation. The non-linearities are due to the difference in the effective beam scan rate when the beam is substantially perpendicular to the latent image containing sheet at the center portion of the sheet and when it is sweeping at an angle to the sheet near the sheet edges. As a result, since the image is constructed based upon on pumping beam timing and orientation, elaborate methods would have to be used in order to effectively relinearize the beam scan to provide an undistorted image.

What is needed, then, is a system and apparatus which can quickly and conveniently provide highly-accurate and high resolution computed radiography visible images without the need for expensive equipment.

SUMMARY OF THE INVENTION

The present invention is embodied in an apparatus and method for radiographic imaging wherein a substrate comprising a computed radiography plate or sheet is exposed to X rays to form a latent image thereon. The apparatus comprises an optical pump source which is a plurality of light emitting diodes (LEDs). The LEDs emit light at two visible wavelengths and one infrared wavelength. The pumping light from the LEDs is supplied to a plurality of transmit optical fibers which deliver the pumping light to the computed radiography sheet being scanned.

Alternatively, a laser carried on a rotating platform can sequentially illuminate ends of the transmit fibers to supply coherent pumping light thereto.

The transmit optical fibers have their delivery ends aligned in a linear array adjacent the position at which they deliver pumping light to the computed radiography sheet. A motor causes the sheet to be moved under the transmit linear fiber array as the sheet is exposed to the pumping light from the transmit fiber ends. In addition, when the LEDs are used as the illumination source the transmit fibers are multiplexed in groups of sixty four, to provide relatively wide spacing between transmit fiber ends that are simultaneously pumping light to the sheet. This avoids bloom from one excitation or pumping fiber to the next at any one time and improves the optical resolution provided by the pumping light.

A second plurality of optical fibers comprises receive optical fibers, each having a diameter of about 500 microns collects the emitted light and supplies it to photodiodes or other optical transducers, such as a photomultiplier tube, which generate an image signal representative of light intensity. That signal is supplied to a processor which generates an image signal. The image signal may then be used to generate a visible image representative of the latent x-ray image on the radiographic substrate.

In a further embodiment of the present invention the apparatus will include a unitary light pipe comprised of a single piece of substantially transparent plastic although glass or other transparent material can be substituted. The light pipe can collect all light available along a scan line at the computed radiography plate and carry it to a photodetector, usually a photomultiplier, for conversion to an electrical signal. With this type of construction most of the intermediate optics found in prior art computed radiography plate scanning systems is avoided. Many problems associated with optical misalignment, dust, vibration, leading to temporary misalignment, and lack of scan linearity is reduced if not eliminated.

In addition, the only moving parts, effectively speaking in the optical train are the plate feeding mechanism and the laser. No other of the optical components are separately movable which might lead to misalignment problems.

A further advantage of the present invention is that the system allows the use of standard power and networking interfaces to allow easy transfer of information from the system to a personal computer such as a laptop computer for generation of an image. The apparatus also can be used as part of a larger radiography system should it be so desired.

It is a principal aspect of the present invention to provide a high resolution radiographic imaging apparatus.

Other aspects and advantages of the present invention will become obvious to one of ordinary skill in the art upon a perusal of the following specification and claims in light of the accompanying drawings.

BRIEF DESCRIPTION OF THE DRAWINGS

FIG. 7 is a sectional view of an alternative apparatus embodying the present invention;

FIG. 8 is a schematic diagram of another alternative embodiment of the present invention;

FIG. 11 is a section taken substantially along line 11—11 of FIG. 10;

FIG. 12 is a section of a portion of the apparatus shown in FIG. 9 showing details of transmit optical fibers and a receive light pipe in proximity with a CR plate being read;

DETAILED DESCRIPTION OF THE PREFERRED EMBODIMENTS

Figure 1:
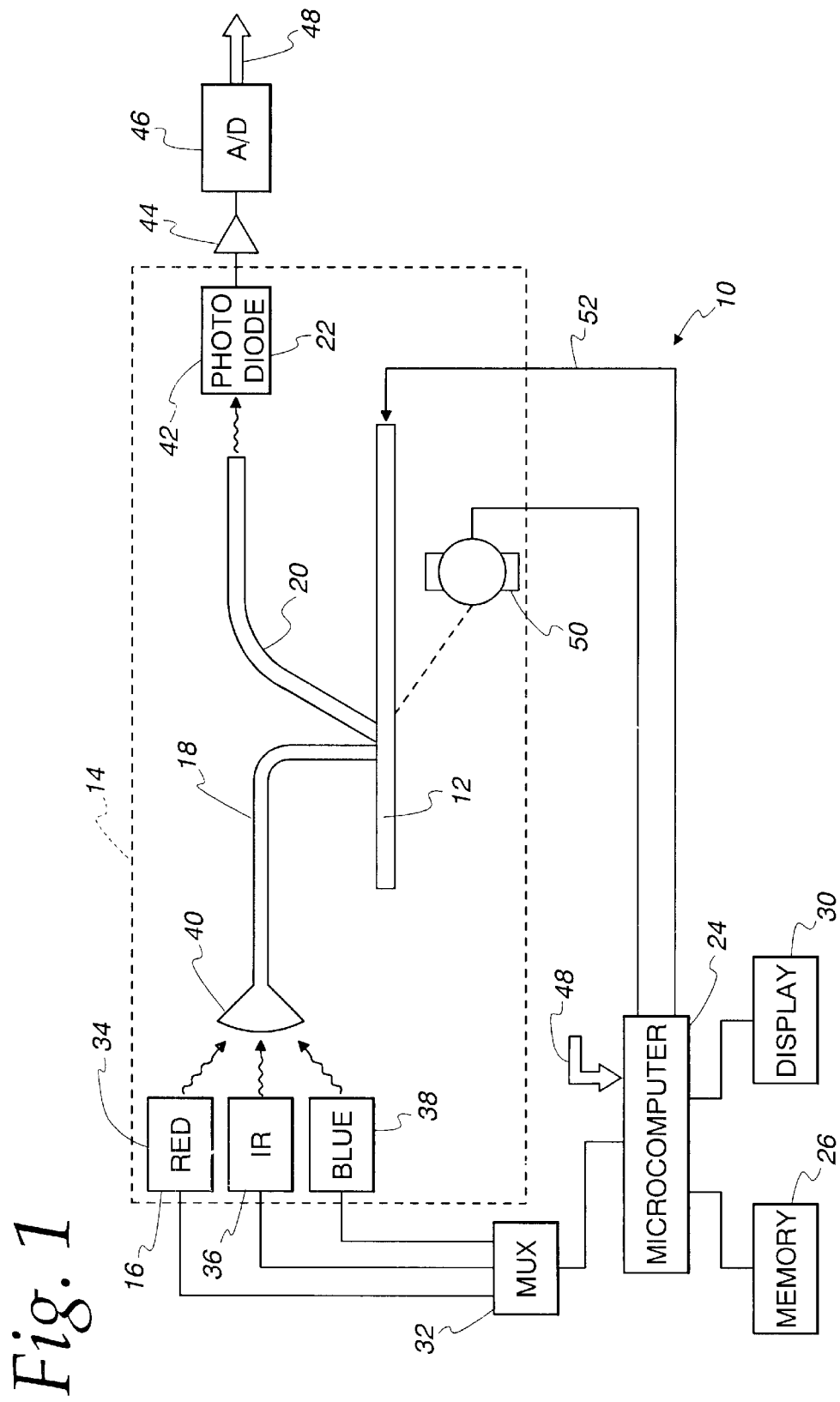
FIG. 1 is a block diagram of an apparatus comprising a computed radiography plate scanner and embodying the present invention.

Referring now to the drawings and especially to FIG. 1, an apparatus embodying the present invention and generally identified by reference numeral 10 is shown therein. The apparatus 10 comprises a computed radiography plate scanner for use in scanning an exposed computed radiography plate 12, which may be a computed radiography plate or a computed radiography sheet. The computed radiography plate scanner 10 produces a visible image of the latent X-ray image stored on the computed radiography plate 12. The computed radiography plate or sheet 12 is normally held in a light-tight cassette but is removable from the cassette for reading or scanning.

The apparatus 10 comprises a light-tight enclosure 14 for holding the computed radiography plate 12 during scanning. An optical pump source 16 produces pumping light to be delivered to the computed radiography plate 12 in order to generate phosphorescence in response to a latent x-ray image formed therein. The pumping light is carried from the optical pump source 16 through a plurality of transmit optical fibers 18 to the vicinity of the substrate 12. A second plurality of optical fibers 20, more specifically a plurality of optical receive fibers, receives localized light produced by phosphorescence from the optical pumping source 16 and delivers that phosphorescent light to an optical receiver 22. The optical receiver 22 converts the received phosphorescent light from the second fiber array 20 to an electrical signal which is supplied to a processor 24. The processor 24, in conjunction with a memory 26, generates a display of the latent image formed on the computed radiography plate 12 by previous X-ray exposure.

A housing 28 holds and defines the light-tight enclosure 14. Within the housing 28 is the processor 24 which is more specifically a microprocessor or a microcomputer. A display 30 is connected to the processor 24 to provide a visual readout to a user. The processor 24 preferably may be a microprocessor or a microcomputer The processor 24 controls operation of the optical pump source 16 via a multiplexer 32. The multiplexer 32, under the control of the processor 24, selectively energizes a red pumping light emitting diode 34, an infrared pumping light emitting diode 36 or a blue light-emitting diode 38 of the optical pump source 16, either one at a time or simultaneously. This is done in order to transmit pumping light or calibrating light to a lensing body 40 of one of a 25–50 micron optical fiber of the plurality of transmit optical fibers 18 for delivery of pumping light to the computed radiography substrate 12. Received light creates phosphorescence at a pixel on the plate 12 which was exposed to X rays and is carried along one of the receive fibers 20 to the optical receiver 22, which comprises a photodiode 42. The photodiode 42 converts the phosphorescent light to an electrical image signal.

An operational amplifier 44 amplifies the electrical image signal and feeds an amplified analog received phosphorescent light signal to an analog-to-digital converter 46 which provides a digital output signal. The digital output signal is on a bus 48 indicative of the spot density or spot intensity. In addition, the computed radiography plate or sheet 12, which is held within the light-tight enclosure 14, is moved by a stepper motor 50, under the control of the processor 24, past the optical fiber arrays 18 and 20 to cause the plate 12 to be scanned. The processor 24 then provides output signals on an output position bus 52 indicative of the position being read on the sheet 12. The position is indicated both transversely with respect to the optical arrays 18 and 20, and longitudinally with respect to the travel of the sheet 12.

Figure 2:
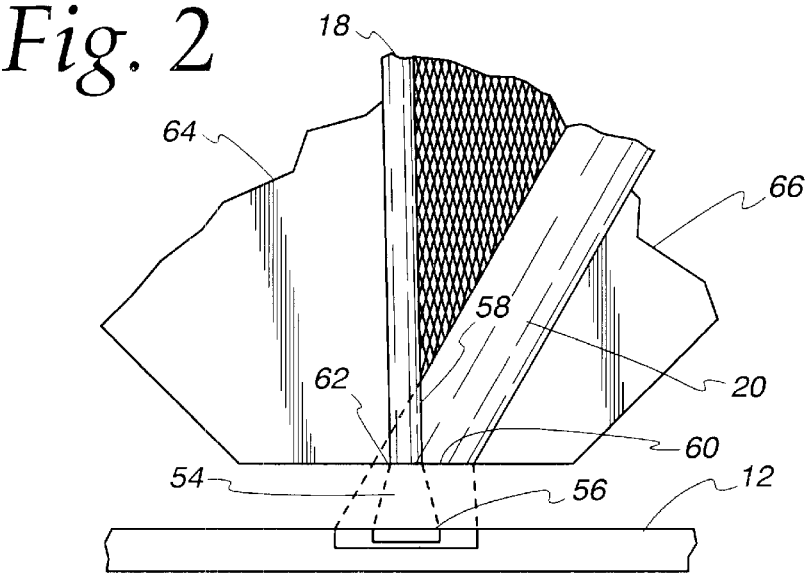
FIG. 2 is a detailed view of an orientation of a transmitting fiber and a receiving fiber of the apparatus shown in FIG. 1.

The method and the apparatus of the present invention employs multiple light emitting diodes, one of which can emit light having a wavelength of 940 nanometers or in the near-infrared region. The second diode, emits light having a wavelength between 630 and 650 nanometers in the red region. The third diode emits light in the blue region. The diodes are each coupled to a separate 50 micron diameter clad optical fiber used as a transmission fiber. The transmission fiber delivers the infrared, the red, or the blue light to the computed radiography plate 12, as may best be seen in FIG. 2. In that figure, one of the 25 to 50 micron clad fibers 18 extends substantially perpendicular to the computed radiography plate 12 and emits a fan-like beam 54 of infrared or red light which strikes the computed radiography plate 12 at a spot 56. The area immediately around the spot 56 is excited by the pumping light and emits light by phosphorescence. The amount of phosphorescent light emitted is dependent upon the amount of X-ray energy stored at the point on the computed radiography plate 12.

Figure 3:
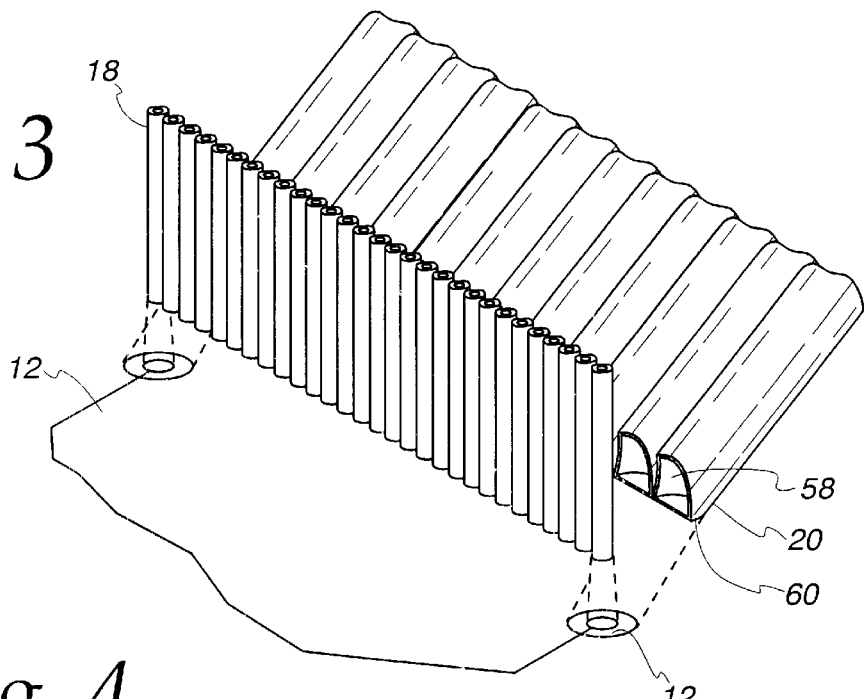
FIG. 3 is an exploded perspective view of the apparatus shown in FIG. 1 showing details of a transmitting optical fiber array and a receiving optical fiber array positioned over a computed radiography plate.
Figure 4:
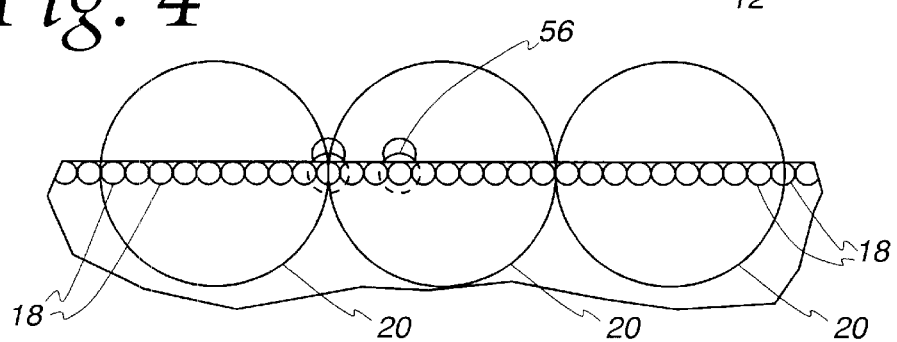
FIG. 4 is a diagrammatic view of a layout of the transmitting optical fibers with respect to larger receiving optical fibers of the apparatus shown in FIG. 1.
Figure 5:
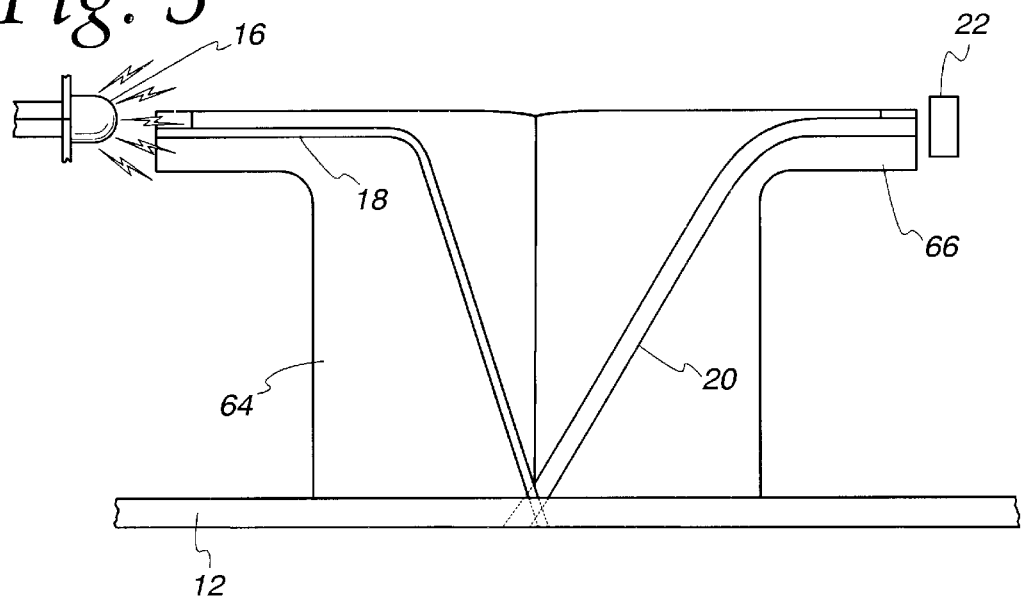
FIG. 5 is a sectional view of the apparatus shown in FIG. 1 shown partially in schematic and showing a light path through the apparatus.
Figure 6:
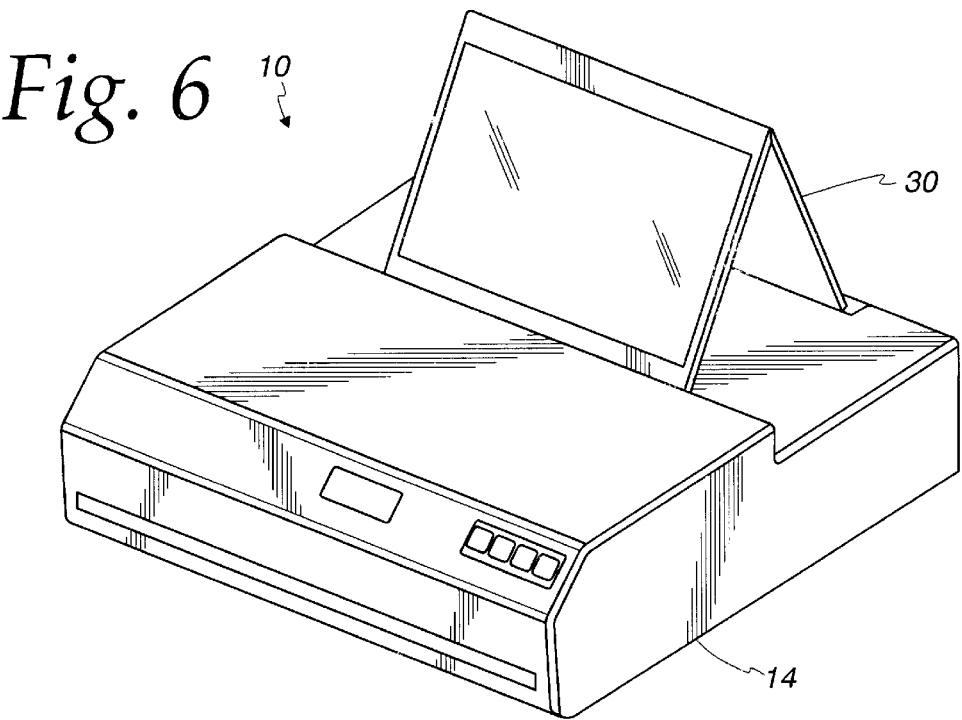
FIG. 6 is a perspective view of the apparatus shown in FIG. 1.

The phosphorescent light is collected by a 500 micron diameter clad optical receive fiber 20 which extends away from the plate 12. The receive fiber 20 has a vertical matching face 58 and a light receiving face 60 to allow a lensing region 62 of the transmit fiber 18 to be positioned very close to the collection face 60 of the receive fiber 20 to provide extremely high image resolution. The transmit fiber 18 is one of approximately 8,000 transmit fibers, as may best be seen in FIG. 3. The transmit fibers 18 each may be separately excited by a light-emitting diode.

The plurality of transmit fibers 18 is supported by an aluminum transmit base plate or support bar 64, in order to maintain the fibers 18 in registration and in linearity so that they will be positioned a relatively short distance above the computed radiography plate 12. The computed radiography plate 12 is moved by the stepper motor underneath the fiber arrays 18 and 20 allowing rapid scanning of the computed radiography plate 12. In addition, the receive fibers 20 are supported by a receive fiber plate or support arm 66, which is composed of aluminum.

Another advantage of the present invention is that through the use of LEDs to provide pumping light, the pass bands are broad enough that they need not be specifically tuned to a specific frequency. The broad band LED outputs transfer energy to which the various computed radiography plates are sensitive. In addition, the transmit and receive optical fiber arrays 18 and 20 can be calibrated by providing blue light through the transmitting fibers 18 and then collecting the light through the receive fibers 20 to determine the exact registration of the blue light which is being provided to the computed radiography plate 12.

In effect, three LEDs are provided through a lensing system to feed the transmit fibers 18. This provides a great deal of convenience because, due to the multiple frequencies of the LEDs, different types of computed radiography plates can be used in a single scanner.

Furthermore, emission can take place in both the infrared and the visible red band simultaneously so that any type of computed radiography plate can be read. Through the use of the transmit fiber optics, the light can be focused precisely on the computed radiography plate 12 to reduce the pixel size to about 50 microns.

Furthermore, the transmitting fibers 18 are energized in multiple units; however, only every sixty-third or sixty-fourth fiber in the transmit fiber array 18 is energized at a time to provide a wide distance between simultaneously energized fibers. This avoids crosstalk between energized spots on the computed radiography plate 12. The multiple energization through the transmit optical fibers 18, however, provides very rapid response back through the receive fibers 20 while avoiding crosstalk and smearing of the image at the computed radiography plate 12. The received light, coming into the 500 micron receive optical fibers 20, is then received by separate photodetectors 68 which generate a received light signal. The received light signal is then amplified in the operational amplifier circuit. The operational amplifier provides a low-noise signal to an analog to digital converter which, in the present embodiment, has sixteen bits of resolution and provides a sixteen-bit intensity signal for further processing for displaying an image or the like.

In order to provide the highly-accurate spot sizes, the 500 micron receive fiber 20 ends are polished flat in order to allow them to be seated against the transmit fibers 18 without distorting the transmit fiber array 18 line into a catenary or sine-wave line, which would lead to distortion in the excitation areas on the computed radiography plate 12. Further, the transmit fibers 18 are held in alignment by the transmit support bar 64 to which they are attached even though they are brought into intimate contact or very close to the receive fibers 20. Likewise, the receive fibers 20 are rigidly held by the receive fiber support bar 66 and then both the receive fibers 20 and the transmit fibers 18 are covered with a potting compound or a suitable opaque compound 70, which prevents light from entering the fibers 18 and 20 through their sides, thereby reducing crosstalk, and holds them rigidly over a wide range of temperatures. The fiber ends may be supported by an air bearing at about 0.0015 to 0.0020 inches above the computed radiography plate 12 being scanned. This will provide high resolution scanning by reducing or eliminating the spot overlap at the computed radiography plate 12.

Furthermore, through the use of the multiple LEDs 34, 36, and 38 and the multiple transmit fibers 18, the blue LED 38 can be used to monitor, using non-phosphorescent-generating or normalizing light, in order to determine if an LED has gone out. This would be indicated by the normalization data going out of range rapidly.

Furthermore, the use of the multiple transmit fiber elements 18 enables the adjacent 50 micron pixel regions on the computed radiography plate 12 to be energized individually and allows determination of the degree of blooming or smearing noise or residuals.

As may best be seen FIG. 7, in an alternative embodiment of the present invention apparatus or a computed radiography scanner 100 having a plurality of excitation or transmit optical fibers, as exemplified by a pumping or excitation fiber 102 having a core diameter of about 27 microns, supplies a pumping light to a substrate 104, which may be a computed radiography plate or sheet, in a light cone 105. Phosphorescent emissions 106 may be received back by a first receive fiber 110 and a second receive fiber 112 on opposite sides of the excitation fiber 102. In order to capture more of the emitted phosphorescent light from the computed radiography plate 104 the receive optical fibers 110 and 112 may be combined at a receive fiber junction 114 to supply a larger optical output for ultimate detection by an optical receiver 116.

Referring now to FIG. 8, another alternative embodiment of the present invention is shown therein and generally identified by reference numeral 210. It comprises a computed radiography scanner for use in scanning an exposed computed radiography substrate 212, which may be a computed radiography plate or a computed radiography sheet. Such a computed radiography plate or sheet 212 is normally held in a light-tight cassette but is removable for reading or scanning.

The computed radiography scanner 210 comprises a light-tight enclosure 214 for holding the computed radiography plate 212 during scanning. An optical pump source 216 produces pumping light to be delivered to the plate 212 in order to generate phosphorescence in response to a latent X-ray image formed therein. The pumping light is carried from the optical pump source 216 through a plurality of transmit optical fibers 218 to the vicinity of the substrate 212. A second plurality of optical fibers 220, more specifically a plurality of optical receive fibers, receives localized light produced by phosphorescence stimulated by the optical pumping light and delivers that phosphorescent light to an optical receiver 222. The optical receiver 222 converts the received phosphorescent light from the receive optical fibers 220 to an electrical signal which is supplied to a processor 224. In conjunction with a memory 226, the processor 224 generates a display signal representative of the latent image from the computed radiography sheet 212.

A housing holds and defines the light-tight enclosure 214. Within the housing is the processor 224, which is, more specifically, a microprocessor or a microcomputer, but may also be embodied in a custom integrated circuit or the like. The memory 226 is connected to the processor 224 and may be used to store instructions and/or data. A display 230 is connected to the processor 224 to receive the display signal therefrom and in order to provide a visual reconstructed image of the phosphorescent image, which itself is representative of the latent X-ray image. More specifically, the display 230 displays a visible image counterpart to the latent image formed on the computed radiography plate 212 by the X-ray exposure. The processor 224 controls the optical pump source 216 via a power supply 232. The power supply 232 energizes a helium-neon laser 234 carried on a circular platform 236. The circular platform 236 is rotatable about a shaft 238 by a DC servo motor 240 under the control of the processor 224.

The optical receive fibers 220 are substantially identical to the optical receive fibers 20. With the exception that the optical fibers 218, receive, at a plurality of circularly-arranged input fiber ends 242, laser light from the laser 234 which is scanned by the rotating turntable 236 to inject the laser pumping light directly and serially into each of the transmit fibers 218. This causes a pumping light raster scan to take place across the transmit fiber array 218 at the computed radiography plate 212. The raster scan through the small diameter transmit fibers 218 ensures that high resolution optical excitation is provided to the computed radiography plate 212, thereby providing a high resolution phosphorescent signal to the receive fiber array 220. This ultimately enables the creation of a high resolution image by the display 230.

In order to provide further gain in the computed radiography scanner 210, the optical receiver 222 comprises a photomultiplier tube 246, which is connected to an amplifier 248. The photomultiplier tube 246 provides an image signal which is amplified by an amplifier 248 to provide another image signal comprising an analog amplified image signal. The amplifier 248 is connected to an analog to digital converter 250 which converts the analog amplified image signal to still another image signal comprising a digital image signal and sends the digital image signal on an image signal bus 252 to the processor 224 for display of the visible image on the display 230.

The computed radiography plate 212 is moved with respect to the transverse raster scanning direction by a stepper motor 254 under the control of the processor 224, to which it is connected. The position of the computed radiography plate 212 is sensed and a plate location signal is sent to the processor 224 over a line 256. This allows the processor 224 to create a high resolution digital image from the phosphorescent light being returned from the computed radiography plate 212.

Figure 9:
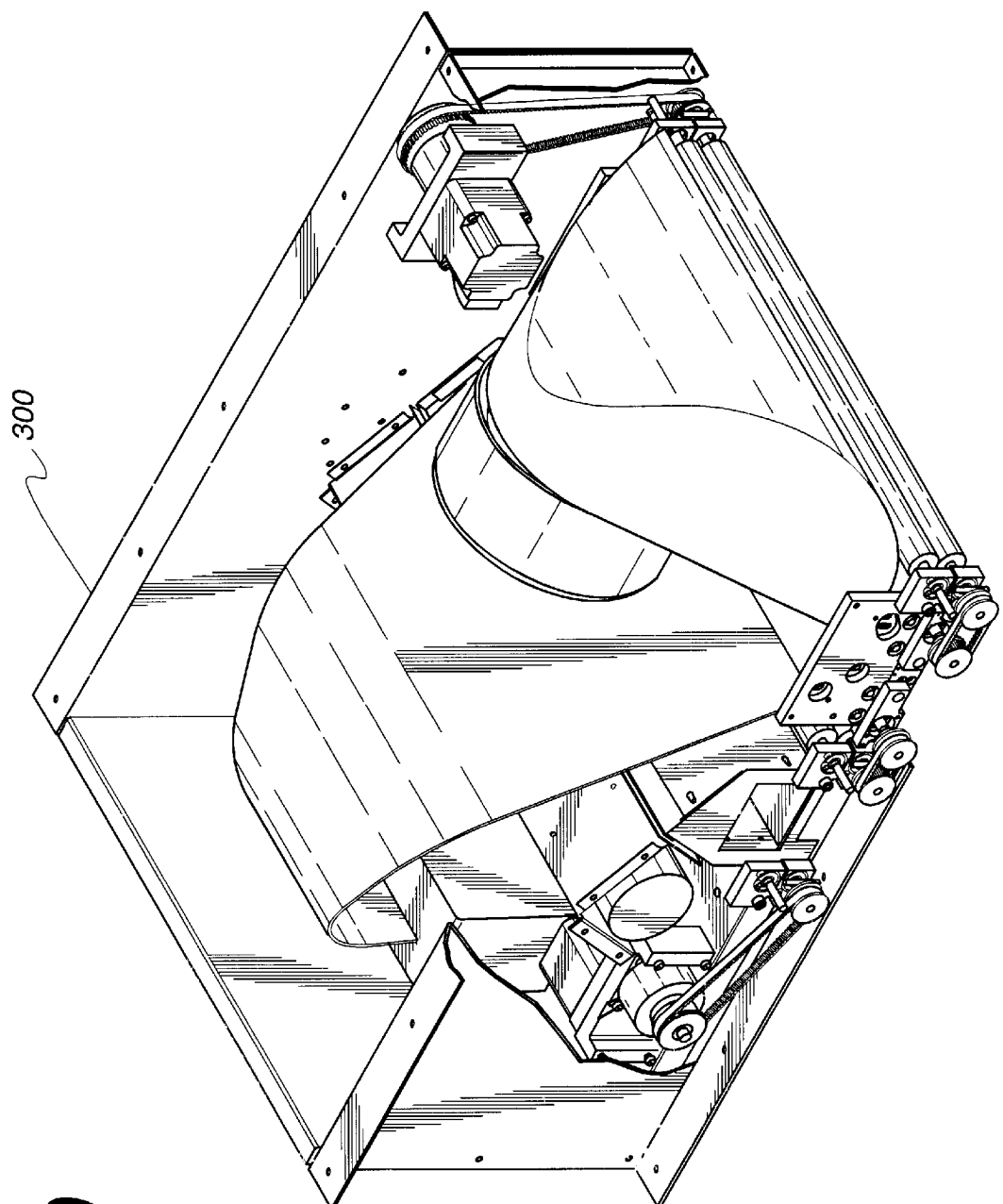
FIG. 9 is a perspective view of still another alternative embodiment of the present invention.
Figure 10:
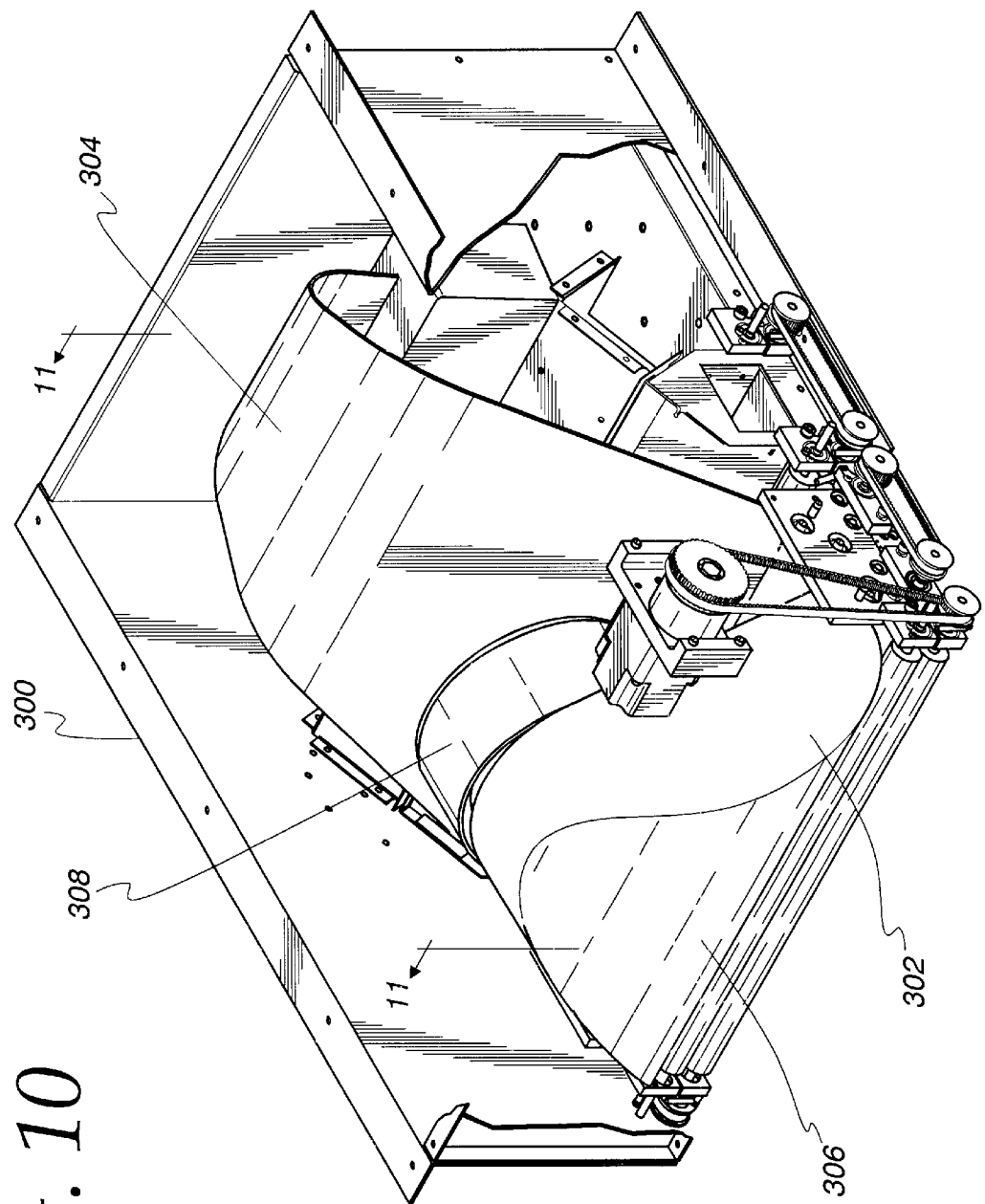
FIG. 10 is another perspective view of an apparatus shown in FIG. 9.

An apparatus 300, as shown in FIGS. 9 and 10, comprises still further embodiment of the present invention includes a light transmitting unit 302 and a light receiving unit 304. The light transmitting unit 302 has an optical fiber section 306 with a drive and laser illuminator section 308 associated therewith. As may best be seen in FIG. 11, an electric motor 310 has its drive shaft connected to a circular carrier plate 312 having a laser 314 positioned thereon for emitting or launching laser pumping light into a plurality of transmit optical fibers 318. The transmit optical fibers 318 comprise 50 micron fibers and are formed originally on a cylindrical drum 320, a portion of which is cut off and present in the system.

The optical fibers 318 are wound from a single fiber around the drum 320 at approximately 8,000 fibers are provided thereto. The drum 320 is then covered with a outer wall 322 and is cut along a cut line 324 in its manufacture. The optical fibers 318 exit the bottom of the drum in a substantially linear array as shown in FIGS. 11 and 12.

Figure 14:
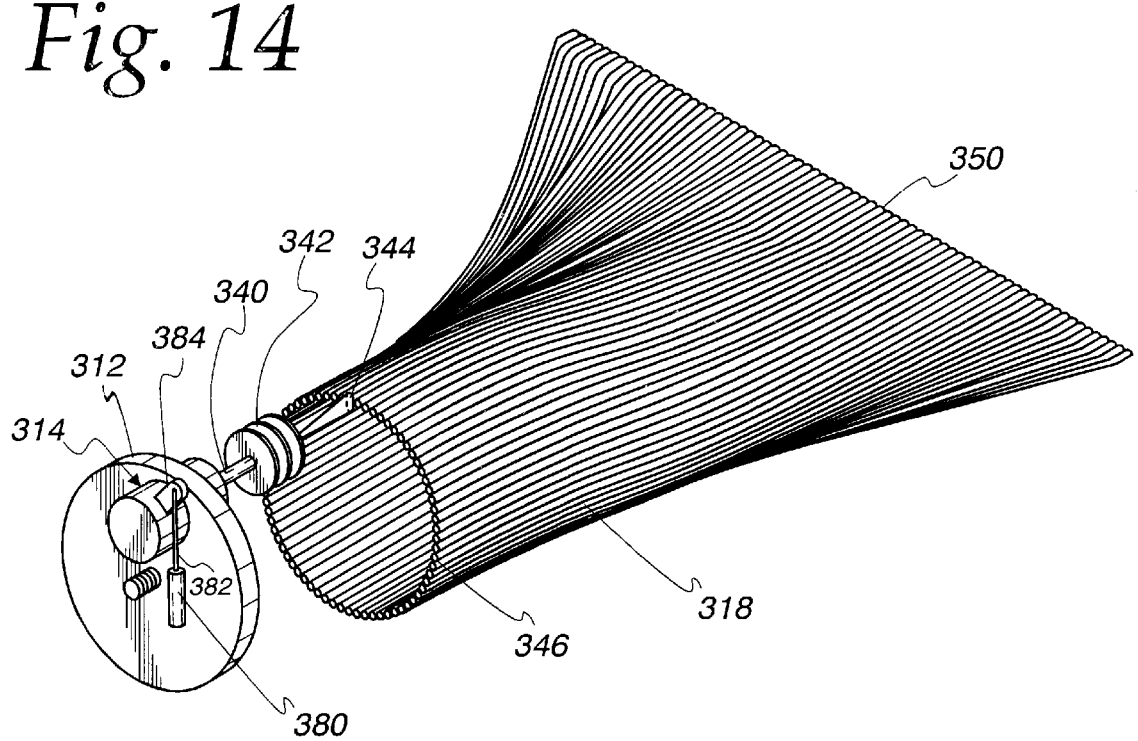
FIG. 14 is a perspective schematic view of a portion of the apparatus shown in FIG. 9 including details of a laser, a rotatable carrier carrying the laser, a lens train, and the transmit optical fibers.

The fibers 318 are positioned closely with a computed radiography plate 326 which may enter an inlet 328 of the system 300, pass over a pair of guide rollers 330 and 332 which are powered to drive the plate 326 toward the region where the optical fibers 318 terminate in a linear array. At that region light from the laser 314 is carried sequentially down the optical fibers as the laser 314 is rotated with respect to the optical fibers 318 and, as may best be seen in the schematic view shown in FIG. 14, allows a light beam 340 to pass through an optical train 342 consisting of a double convex lens and a meniscus or concavo-convex lens. The focused pumping light is forms a substantially elliptical footprint 344 at a plurality of ends 346 of the optical fibers 318. The ends 346 are arranged substantially in a circle and receive the laser light. The pumping light then exits the optical fibers 318 at a plurality of output ends 350 where it is delivered to the computed radiography plate 326 for scanning. X-ray energy previously stored in the CR plate 326 is released as emitted light having been stimulated by the pumping light. The emitted light enters a one-piece light pipe 352 which comprises a portion of the light receiver 304. The one-piece light pipe 352 comprises a tapering transparent plastic body which sends light to an optical receiver section 360. The optical receiver section 360, as will be seen further, includes a photomultiplier 362 for receiving light emitted from the computed radiography plate 326 and developing an electrical signal therefrom.

The computed radiography plate 326 then is carried to the right between another pair of rollers 370 and 372 driven by a stepper motor and may be carried into a plate storage section 374. In other embodiments, the plate storage section 374 may be open to allow the plate to extend out the back. A continuous loop-type plate may be used in that modified scanner so that a single loop of computed radiography plate or sheet material may continuously pass through the scanner to provide continuous scanned images, for instance, in an industrial X-ray system which needs to monitor operations dynamically.

After having been scanned the CR plate 326 is carried by the rollers through a exit region from an exposure area, an eraser head 380 comprising a plurality of eraser lamps 382 illuminates the plate 326. This causes the excess or residual X-ray energy that has been stored in the plate 326 to be released as blue light thereby erasing the plate. The plate 326 will then be reversed and sent back, in FIG. 11 to the left out of the storage area, past the eraser head 380 again and the exposure are including the optical fiber 318 and the light pipe 352 and the apparatus 300 will be ready to receive an additional plate for further scanning.

Figure 15:
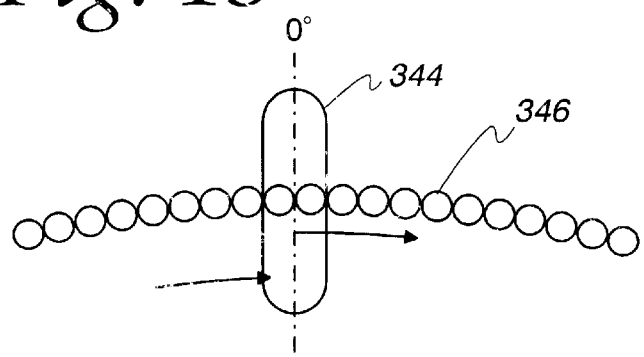
FIG. 15 is a representation of single fiber excitation in a high resolution mode.
Figure 16:
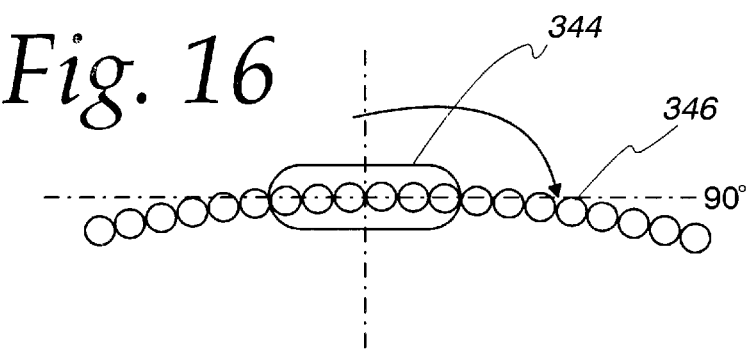
FIG. 16 is a representation of multiple fiber illumination in a low resolution, fast scanning mode.

The CR plate 326 may be scanned either at low speed and high resolution or high speed and low resolution. In the low speed, high resolution mode, the elliptical illumination spot on the fiber ends 346 is oriented as shown in FIG. 15 where only one or two fibers are illuminated at a time as the pumping beam is swept past. It may be appreciated that a major axis of the illumination ellipse extends substantially along a radius of rotation of the carrier plate 312. The laser 314, however, can be rotated with respect to the carrier plate 312 by an actuator 380 connected via an arm 382 to a moment arm 384 connected to the laser 314 to cause the laser to rotate 90° about its illumination ellipse 344 so that the major axis is substantially parallel to a tangent plane to the fiber ends 346.

In this way up to ten optical fibers can be illuminated and a rapid scan can be made of the CR plate 326 albeit at lower resolution. Such rapid scans are particularly useful for processing scout shots where an initial determination is being made as to whether a lesion is in fact present or not.

Figure 13:
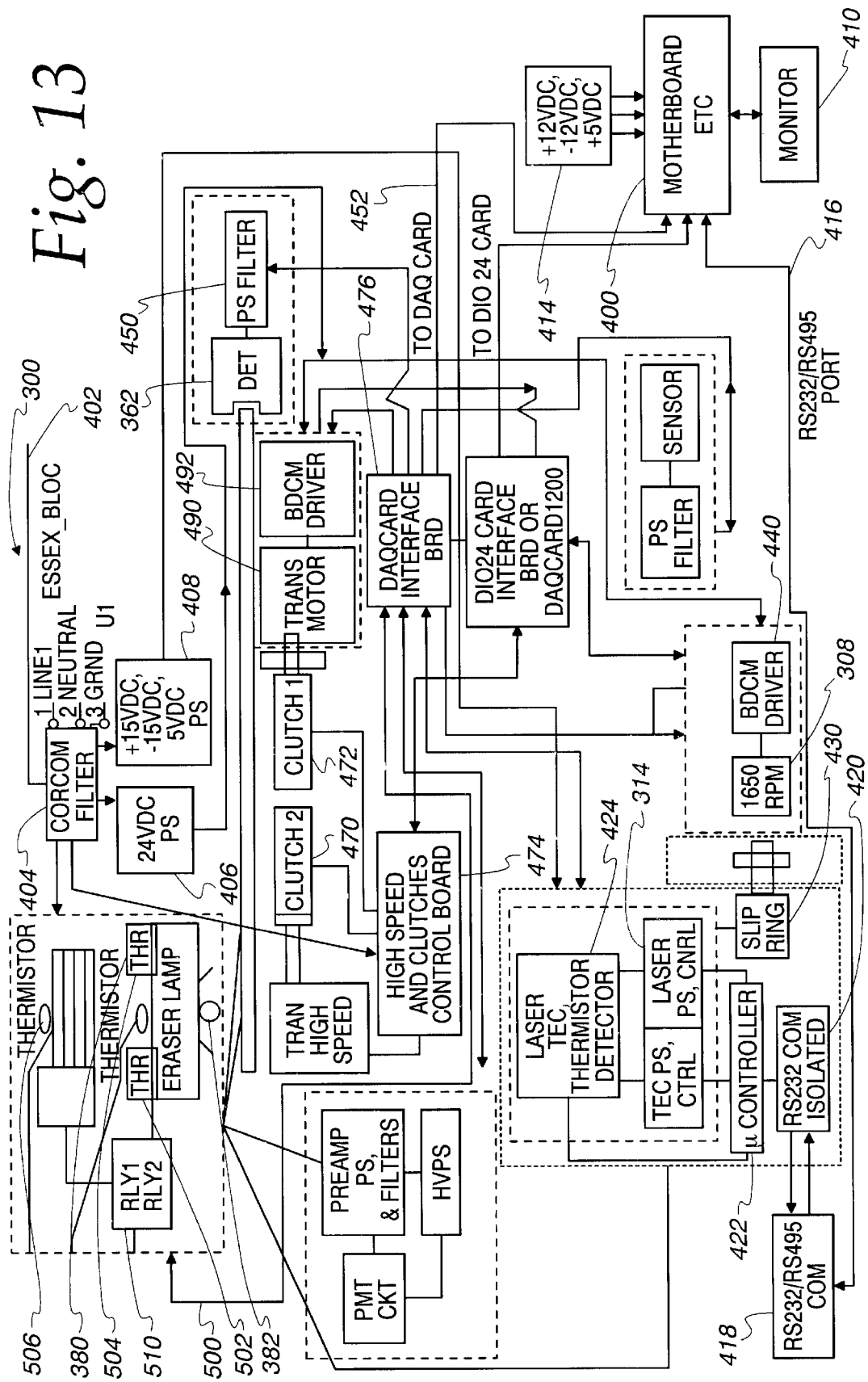
FIG. 13 is a block diagram of the apparatus shown in FIG. 9.

The apparatus 300 is controlled by a personal computer, which maybe a laptop, 400 as shown in FIG. 13. Power for the apparatus 300 is received from an AC line voltage source on a line 402. The power which is supplied to a filter 404 and DC power is developed by a pair of DC power sources 406 and 408 for use in other portions of the apparatus 300. The computer 400 is also connected to a display or a monitor 410 for displaying video images. The computer 400 has a separate power source 414. The computer 400 communicates with the portions of the apparatus 300 via an RS-232 or RS-495 port 416, which is connected to a communications port 418 for communication therewith. That communication port 418 conveys digital signals through an isolation section 420 to a microcontroller 422 which is mounted on the rotatable carrier plate 312 and is used to control the laser 314 and also to detect laser temperature functions via a module 424. Feed signals are supplied to the microcontroller 422 via a connection through a slip ring section 430 and the microcontroller 422 and the laser 314 are rotated by the motor 308 controlled by a motor controlled driver 440.

The photomultiplier 362 has its output filtered by a filter 450 and a signal is ultimately supplied through an interface board to the computer 400 over a bus 452. The apparatus 300 also allows control from the computer 400 of a pair of clutches 470 and 472 for control of the rollers through a high speed clutch control 474 coupled via an interface card 476 to the processor. A stepper motor 490 controlled through a motor control circuit 492, coupled through the interface cards to the computer 400, controls scanning, storage and retrieval movement of the computed radiography sheet 326 through the apparatus 300.

The interface card 476 is also connected via a control bus 500 to the eraser lamps 382 of the eraser 380. A plurality of thermistors 502, 504 and 506 supplies signals back through the interface card to the computer 400 to warn of overtemperature conditions. In the event of such over temperature the computer 400 will cause the eraser lamps 382 to be shut down to avoid damage to the apparatus 300 or the computed radiography sheet 326. The eraser lamps 382 are controlled through relay circuits 510 connected through the interface board 476.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. Apparatus for radiographic imaging comprising:
    an optical pump source for generating light;
    a carrier for carrying the optical pump source in a closed arc;
    a first plurality of optical fibers for delivering the light from the optical pump source to a radiographic medium, the optical fibers of the first plurality having light receiving ends positioned about the closed arc to receive the light;
    an optical collector for receiving phosphorescent light from the radiographic medium stimulated by the light from the optical pump source;
    an optical receiver for receiving the phosphorescent light from the optical collector and producing an optical signal in response thereto; and
    a processor for generating an image signal responsive to the optical signal from the optical receiver.

2. Apparatus for radiographic imaging according to claim 1 wherein the optical collector comprises a light pipe.

3. Apparatus for radiographic imaging according to claim 2 wherein the optical collector comprises at least one optical receive fiber.

4. Apparatus for radiographic imaging according to claim 3 wherein the optical receive fiber comprises one of a plurality of optical receive fibers.

5. Apparatus for radiographic imaging according to claim 1 wherein the optical pump source comprises a plurality of light emitting diodes.

6. Apparatus for radiographic imaging according to claim 5 wherein one of the light emitting diodes comprises an infrared light emitting diode.

7. Apparatus for radiographic imaging according to claim 1 wherein the optical pump source comprises a laser.

8. Apparatus for radiographic imaging according to claim 1 wherein the optical receiver comprises a photodiode.

9. Apparatus for radiographic imaging according to claim 1 wherein the optical receiver comprises a photomultiplier tube.

10. Apparatus for radiographic imaging according to claim 1 further comprising an amplifier coupled to the optical receiver for increasing the amplitude of the optical signal.

11. Apparatus for radiographic imaging according to claim 1 further comprising an amplifier for receiving the optical signal and amplifying it and an analog to digital converter for converting the optical signal to digital optical signal and supplying the digital optical signal to the processor.

12. Apparatus for radiographic imaging according to claim 1 further comprising a display coupled to the processor for displaying a visible image corresponding to a latent image on the radiographic medium in response to the image signal.

13. Apparatus for radiographic imaging according to claim 1 wherein the optical source comprises a laser which is rotatable about its optical axis to shift and elliptical illumination spot into and out of a tangent plane defined by the optical fibers to provide high resolution single spot scanning when an major axis of the ellipse is perpendicular to the tangent plane and low resolution high speed scanning by simultaneously illuminating several fiber ends when the major axis of the ellipse is substantially aligned with the tangent plane.

14. Apparatus for radiographic imaging according to claim 1 wherein the optical fibers are arranged a plurality of rows.

15. Apparatus for radiographic imaging according to claim 1 wherein the inlet ends of the optical fibers are arranged substantially in a circle and the outlet ends of the optical fibers are arranged in a linear array with the circle blending smoothly into the linear array.

16. Apparatus for radiographic imaging according to claim 1 wherein the scanner comprises a continuous scanner and the computed radiography sheet is a continuous loop sheet for continuous X-ray exposure and continuous image development.

17. Apparatus for radiographic imaging according to claim 1 wherein the fibers are arranged in a circle and the fiber ends are substantially uniformly spaced apart.

18. Apparatus for radiographic imaging according to claim 1 wherein the processor clips image signals corresponding to low level emitted light signals to reduce image smearing due to scanning motion and improve resolution.

19. A method for radiographic imaging comprising:
generating pumping light from a optical pumping source;
supplying pumping light directly to less than all of a plurality of optical fibers at any one time by moving the optical pumping source with respect thereto, the optical fibers carry pumping light to a radiographic medium having a latent image which is to be pumped by the light;
receiving light emitted by the radiographic medium in response to the pumping light; and
creating an image related to the latent image and the emitted light received from the radiographic medium.

20. A method for radiographic imaging according to claim 19 wherein the pumping light is scanned across the radiographic medium.

21. A method for radiographic imaging according to claim 20 further comprising moving the radiographic medium with respect to the scanned light.

22. A method for radiographic imaging according to claim 19 further comprising collecting the emitted light locally at the radiographic medium.

* * * * *

UNITED STATES PATENT AND TRADEMARK OFFICE
CERTIFICATE OF CORRECTION

PATENT NO.   : 6,696,698 B2
DATED        : February 24, 2004
INVENTOR(S)  : Troy Livingston It is certified that error appears in the above-identified patent and that said Letters Patent is hereby corrected as shown below:

Column 10,
Line 62, change "and" to -- an --;
Line 65, delete "an";

Column 11,
Line 4, after "arranged" insert -- in --; and

Column 12,
Line 2, change "a" to -- an --.

Signed and Sealed this

Eighth Day of June, 2004

JON W. DUDAS
*Acting Director of the United States Patent and Trademark Office*